US006790396B2

(12) United States Patent
Eiden et al.

(10) Patent No.: US 6,790,396 B2
(45) Date of Patent: Sep. 14, 2004

(54) METHOD OF MAKING ILLUMINATED COVERS

(75) Inventors: Niko Eiden, Helsinki (FI); Marjukka Joutsen, Halikko (FI)

(73) Assignee: Nokia Corporation, Espoo (FI)

( * ) Notice: Subject to any disclaimer, the term of this patent is extended or adjusted under 35 U.S.C. 154(b) by 203 days.

(21) Appl. No.: 09/940,624

(22) Filed: Aug. 29, 2001

(65) Prior Publication Data

US 2004/0081851 A1 Apr. 29, 2004

(51) Int. Cl.⁷ .......................... B29C 33/12; B29C 45/14
(52) U.S. Cl. ...................... 264/132; 264/135; 264/154; 264/250; 264/254; 264/259; 264/275
(58) Field of Search ................................. 264/129, 132, 264/134–135, 138, 139, 154–156, 161, 163, 250, 254, 255, 259, 261, 263, 265, 266, 271.1, 273–275, 278; 156/196, 219, 220, 245

(56) References Cited

U.S. PATENT DOCUMENTS

| | | | |
|---|---|---|---|
| 3,298,558 A | | 1/1967 | Nichol |
| 3,989,775 A | * | 11/1976 | Jack et al. .................... 264/1.9 |
| 4,205,036 A | * | 5/1980 | Trame ......................... 264/132 |
| 4,330,578 A | | 5/1982 | Nishihira et al. |
| 4,406,045 A | * | 9/1983 | Schwab ...................... 29/527.2 |
| 4,495,125 A | | 1/1985 | Hatakeyama et al. |
| 4,994,224 A | | 2/1991 | Itoh et al. |
| 5,227,222 A | * | 7/1993 | Ogawa et al. ............ 428/195.1 |
| 5,363,294 A | | 11/1994 | Yamamoto et al. |
| 5,512,226 A | * | 4/1996 | Rosica et al. ................ 264/132 |
| 5,567,362 A | * | 10/1996 | Gr un ......................... 264/1.31 |
| 5,780,965 A | | 7/1998 | Cass et al. |
| 5,989,480 A | | 11/1999 | Yamazaki |
| 6,117,384 A | | 9/2000 | Laurin et al. |
| 6,137,221 A | | 10/2000 | Roitman et al. |
| 6,229,259 B1 | | 5/2001 | Christensen, Sr. |

FOREIGN PATENT DOCUMENTS

| | | |
|---|---|---|
| EP | 0 755 767 A1 | 1/1997 |
| EP | 0 932 288 A1 | 7/1999 |
| JP | 10134960 | 5/1998 |
| WO | WO 98/49871 | 11/1998 |
| WO | WO 99/18705 | 4/1999 |

* cited by examiner

Primary Examiner—Angela Ortiz
(74) Attorney, Agent, or Firm—Antonelli, Terry, Stout & Kraus, LLP

(57) ABSTRACT

An illuminated cover and a method of making such a cover. An electroluminescent foil overlies a thin, rigid support base, and an insulating foil overlies the electroluminescent foil. A first opening allows insertion of an electrical connector for the electroluminescent foil. A second opening allows insertion of a control key of a device covered by the decorative cover. The covered electronic device further includes a printed circuit board having electronic components mounted on it, including the control key. A connector extends into the first opening to connect the electroluminescent foil to circuitry on the printed circuit board so as to provide electrical power to the electroluminescent foil. A graphic can be included between the electroluminescent foil and the insulating foil. The cover is made by a molding method.

9 Claims, 3 Drawing Sheets

METHOD OF MAKING ILLUMINATED COVERS

FIELD OF THE INVENTION

The present invention pertains to illuminated covers for devices such as cellular telephones. More particularly, the present invention pertains to decorative illuminated covers. The present invention also pertains to a cellular telephone having an illuminated cover, which might be a decorative illuminated cover. Additionally, the present invention pertains to a method of manufacturing an illuminated cover, including a decorative illuminated covers.

BACKGROUND OF THE INVENTION

Portable electronic devices, such as cellular telephones, are becoming widely used. Many people desire to have a unique appearing portable electronic device, particular a cellular telephone, not only for its attractiveness, but also to enable them to identify their own phone or other device from devices belonging to other people.

People often have a cellular telephone when in locations in which the ringing of the telephone is undesirable. In such situations, the ringer of the telephone can be shut-off. However, if a call is placed to the telephone while the ringer is off, the user does not know about the call unless there is some other way to indicate its arrival. While some cellular telephones retain a visual indication of unanswered calls, indicating the calling number, the user of such a phone is unlikely to learn of the call until he or she happens to activate the phone next. This may be a considerable time after the call was placed. If the call related to time sensitive information, the user may lose the benefit of the information because he or she did not notice the call soon enough. While a number of light emitting diodes can be incorporated within the cover of a device such as a cellular telephone, so as to be illuminated in response to the ringing current of the telephone, because of power requirements it is impractical to provide an illuminated decorative pattern of light emitting diodes.

An electroluminescent foil can be utilized to provide a lighted pattern on a electronic device such as a cellular telephone. However, electroluminescent foils require high ac voltage, in the range of from about 20 volts to about 240 volts at from about 50 Hz to about 300 Hz. Consequently, the electroluminescent foil has to be insulated from the person utilizing the electronic device. Satisfactory insulation can be provided by placing the electroluminescent foil between two insulating foils, for example by laminating an insulating foil onto each surface of the electroluminescent foil. The combined foils then must be adhered to a support base shaped to provide the desired cover for the electronic device. Such a support base can be formed by placing the combined foils in a mold, and injecting plastic or other suitable material. By way of examples, U.S. Pat. Nos. 3,298,558, 4,330,578, 4,495,125, 4,994,224, 5,989,480, and 6,117,384, the disclosures of which are incorporated herein by reference, show techniques for molding plastic articles with decorative patterns.

It is necessary for the electroluminescent foil to be connected to a power source. Japanese Patent Publication 10-134960 dated May 22, 1998 shows a molded electroluminescent device having a flexible lead for connection to a power source. However, it is difficult to provide a flexible lead for such connection when the combined foils are adhered to the rigid support base by molding. Frequently, the flexible lead is damaged or destroyed during the molding process, resulting in considerable waste.

SUMMARY OF THE INVENTION

The present is an illuminated cover and a covered electronic device such as a cellular telephone. In addition, the present invention is a method of manufacturing a illuminated cover. An illuminated cover in accordance with the present invention has a predetermined shape and includes a thin, rigid support base shaped in accordance with the predetermined shape. An electroluminescent insulating foil overlies a first surface of the support base. An insulating foil overlies the electroluminescent foil. If desired, a graphic can be positioned between the insulating foil and the electroluminescent foil. A second insulating foil can be positioned between the support base and the electroluminescent foil to protect the graphic from excessive heat during manufacture of the illuminated cover. However, if no graphic is included, then the second insulating foil can be omitted. Likewise, if the graphic would not be damaged by the heat, the second insulating foil can be omitted. The support base and the second insulating foil have a first opening therethrough for insertion of an electrical connector to connect the electroluminescent foil to an electrical power source so as to provide power to the electroluminescent foil. The support base, the first and second insulating foils, and the electroluminescent foil have a second opening therethrough for insertion of a control key of a device to be covered by the decorative cover.

A covered electronic device in accordance with the present invention further includes a printed circuit board having a plurality of electronic components mounted on it which are electrically interconnected to form an electronic unit, such as a cellular telephone. The electrical components include a control key for the electronic unit, with the control key extending through the second opening in the decorative cover. The covered electronic device further includes a connector extending into the first opening of the decorative cover to connect the electroluminescent foil to circuitry on the printed circuit board so as to provide electrical power to the electroluminescent foil.

BRIEF DESCRIPTION OF THE DRAWINGS

These and other aspects and advantages of the present invention are more apparent from the following detailed description and claims, particularly when considered in conjunction with the accompanying drawings in which like parts bear like reference numerals. In the drawings:

DETAILED DESCRIPTION OF PREFERRED EMBODIMENT

Figure 1:
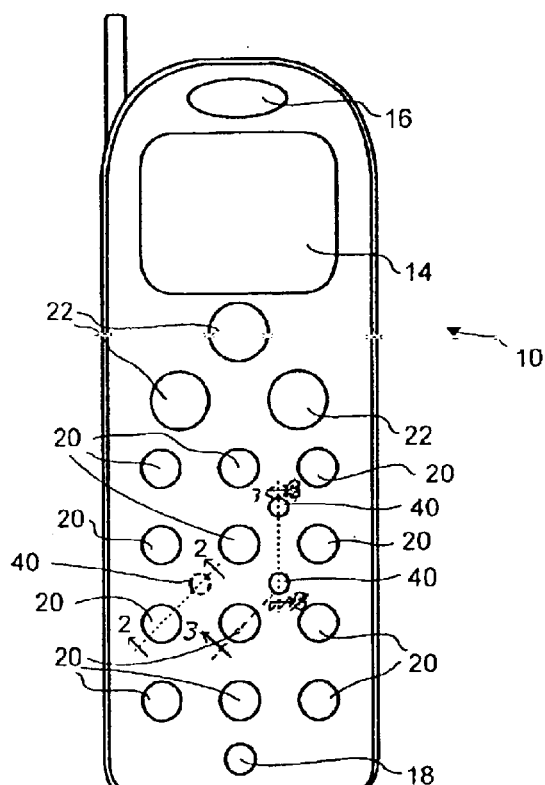
FIG. 1 is a plan view of the underside of a preferred embodiment of an illuminated cover for a cellular telephone in accordance with the present invention.

FIG. 1 depicts the underside of an illuminated cover 10 in accordance with a preferred embodiment of the present invention. Cover 10 is depicted as a cover for a cellular telephone, and so has a number of openings through it. These include an opening 14 for a visual display, an opening 16 for a loud speaker, and an opening 18 for a microphone. As typical in a cellular telephone, a number of openings 20 are provided for control keys such as number keys and * and # keys. Additionally, several openings 22 are provided for various other control keys, such as a key to permit scrolling of a display visible through opening 14 and a key for selection of a highlighted item on such a display.

Figure 2:
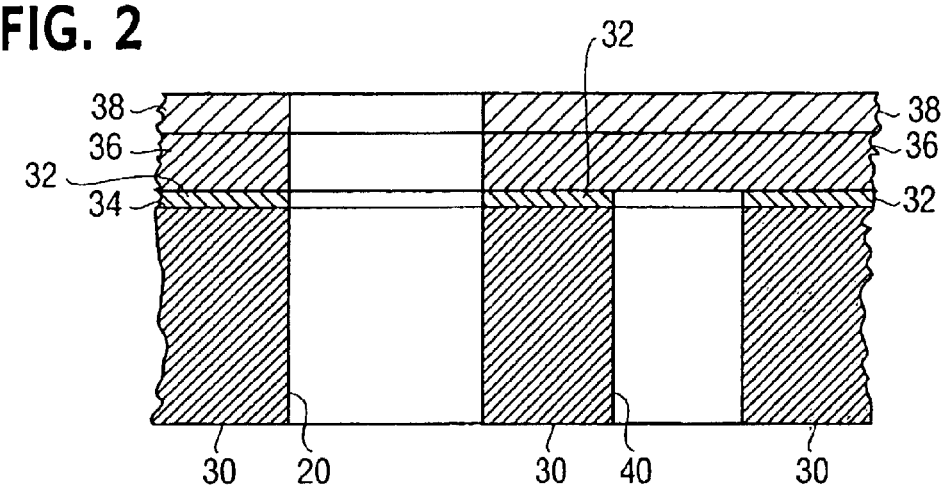
FIG. 2 is an enlarged fragmentary view taken along line 2—2 in FIG. 1 and depicting an embodiment of an illuminated cover.

As can be seen in FIG. 2, illuminated cover 10 includes a thin rigid support base 30. An electroluminescent foil 36 overlies a first surface 34 of support base 30, and an insulating foil 38 overlies electroluminescent foil 36. Preferably, a graphic is provided between electroluminescent foil 36 and insulating foil 38. If the graphic would be damaged by heat during manufacture of illuminated cover 10, then a second insulating foil 32 can be provided between support base 30 and electroluminescent foil 36 to protect the graphic from the heat. By way of illustration, thin rigid support base 30 might have a thickness in the order of about 0.7 mm, second insulating foil 32 might have a thickness in the order of about 0.1 mm, electroluminescent foil might have a thickness in the order of about 0.3 mm, and first insulating foil 38 might have a thickness in the order of about 0.15 mm. Preferably, the complete illuminated cover 10 has a thickness in the range of from about 1 mm to about 2 mm. Support base 30 can be of any suitable material such as, for example, an acrylonitrile-butadiene-styrene (ABS) terpolymer, polycarbonate (PC), an ABS-PC blend, or polymethyl methacrylate. First and second insulating foils 38 and 32 can be of any suitable flexible, insulating material such as, for example, polycarbonate. Electroluminescent foil 36 can be, for example, an electroluminescent film from Seiko Precision, Inc.

Opening 20 passes through rigid support base 30, second insulating foil 32, electroluminescent foil 36, and first insulating foil 38 to permit passage of a control key from the telephone or other device covered by the illuminated cover. In addition, an opening 40 passes through rigid support base 30 and second insulating foil 32, exposing a portion of the surface of electroluminescent foil 36.

Figure 3:
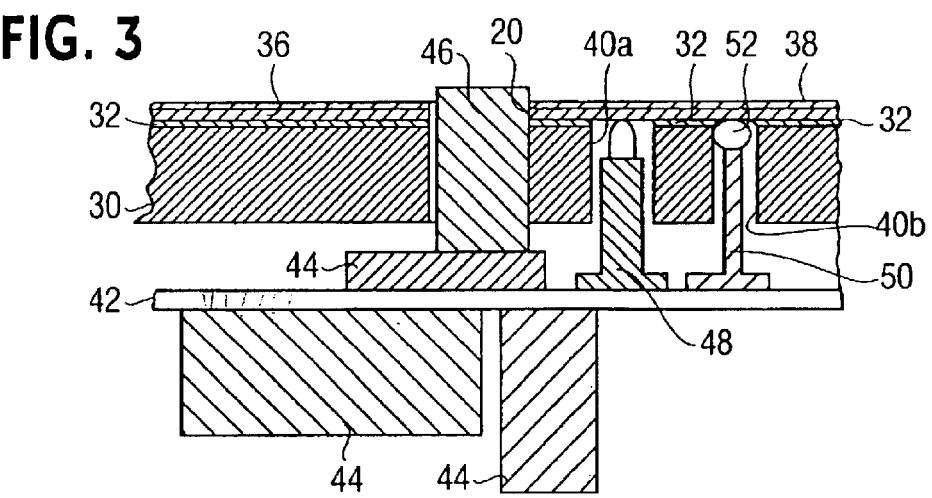
FIG. 3 is an enlarged fragmentary view taken along line 3—3 in FIG. 1 and depicting an embodiment of an illuminated cover.

FIG. 3 illustrates illuminated cover 10 covering a printed circuit board 42 on which electronic components 44 are mounted, with a control key 46 extending through one opening 20. FIG. 3 illustrates two alternative forms of connectors to connect electroluminescent foil 36 with circuitry on printed circuit board 42. A spring biased connecting pin 48, such as a pogo pin, passes through opening 40a to connect electroluminescent foil 36 with circuitry on printed circuit board 42. An alternative type of connection can be provided by a connecting pin 50, the base of which contacts circuitry on printed circuit board 42 and the tip of which is connected to electroluminescent foil 36 by an electrically conductive adhesive 52. Other suitable connecting devices could, of course, be utilized.

Figure 4:
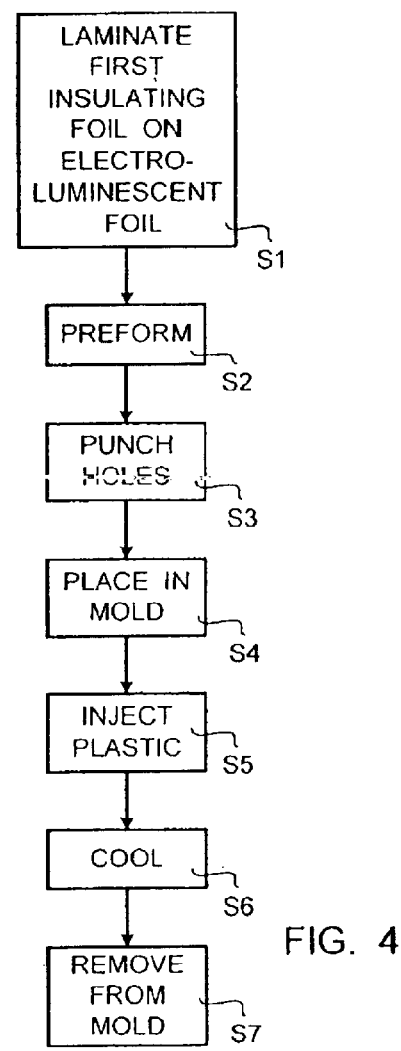
FIG. 4 is a flowchart of a preferred embodiment of a method of manufacturing an illuminated cover in accordance with the present invention.

FIG. 4 is a flowchart of a preferred embodiment of a method of manufacturing an illuminated cover in accordance with the present invention. In a first step S1, first insulating foil 38 is laminated onto a surface of electroluminescent foil 36. In step S2 the preliminary cover member made up of laminated foils 36 and 38 is preformed as required for the illuminated cover to be manufactured. In step S3 holes, such as holes 14–22 and 40 are punched in the preliminary cover member. In step S4, the preliminary cover member is placed in a mold having bosses which correspond with holes 14–22 and 40 to provide corresponding holes in rigid support base 30. In step S5 plastic is injected into the mold to form thin rigid support base 30. In step S6 the molded cover is cooled, and in step S7 the molded cover is removed from the mold.

Figure 6:
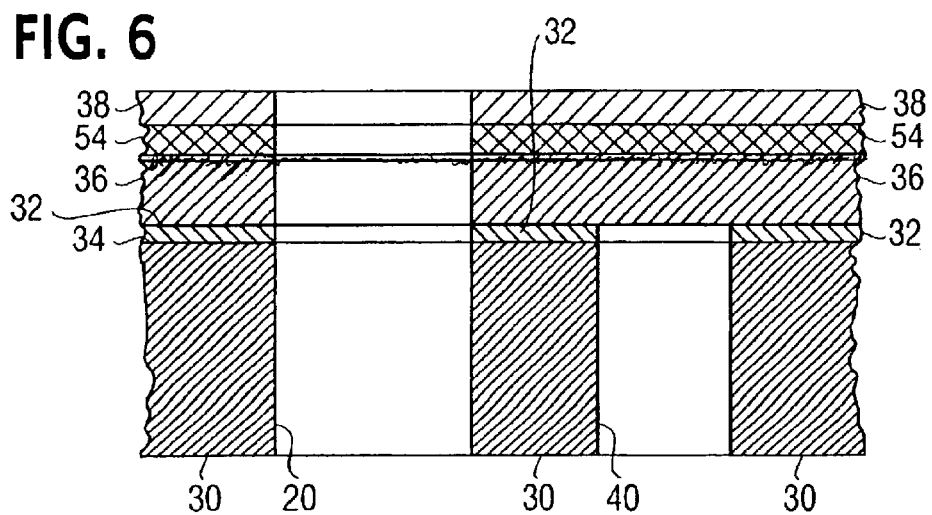
FIG. 6 is an enlarged fragmentary view taken along line 2—2 in FIG. 1, and depicting another embodiment of an illuminated cover.
Figure 5:
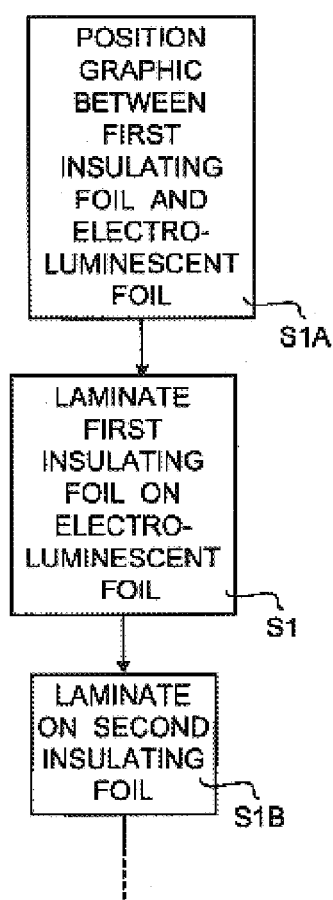
FIG. 5 is a flowchart illustrating an additional step in a preferred embodiment of a method of manufacturing a decorative illuminated cover in accordance with the present invention.

Preferably, the illuminated cover in accordance with the present invention includes a decorative graphic which is emphasized when the cover is illuminated. FIG. 5 is a partial flowchart showing the additional step S1A occurring before step S1 to position the graphic between first insulating foil 38 and the electroluminescent foil 36. As a consequence, when first insulating foil 38 is laminated on electroluminescent foil 36 in step S1, the graphic is provided and is protected by the first insulating foil. FIG. 6 also shows the additional step S1B to laminate the lamination of foils 36 and 38 onto a surface of second insulating foil 32 so that foil 32 is a part of the preliminary cover member. The graphic might be positioned in any of several manners. By way of example, the graphic might be printed on the underside of first insulating foil 38 or on the upper surface of electroluminescent foil 36. Alternatively, as illustrated in FIG. 6, the graphic might be provided on a separate foil 54 which is positioned between the first insulating foil and the electroluminescent foil. The light provided by electroluminescent foil 36 might be white light or colored light, as preferred, either to enhance a graphic or to be attractive without a graphic.

Second insulating foil 32 protects the decorative graphic from excess heat during the molding process. Consequently, if the illuminated cover does not include a decorative graphic, second insulating foil 32 can be omitted. Likewise, if the graphic would not be damaged by heat, second insulating foil 32 can be omitted. In either of these situations, step S1B is omitted from the flow chart of FIG. 5.

Figure 7:
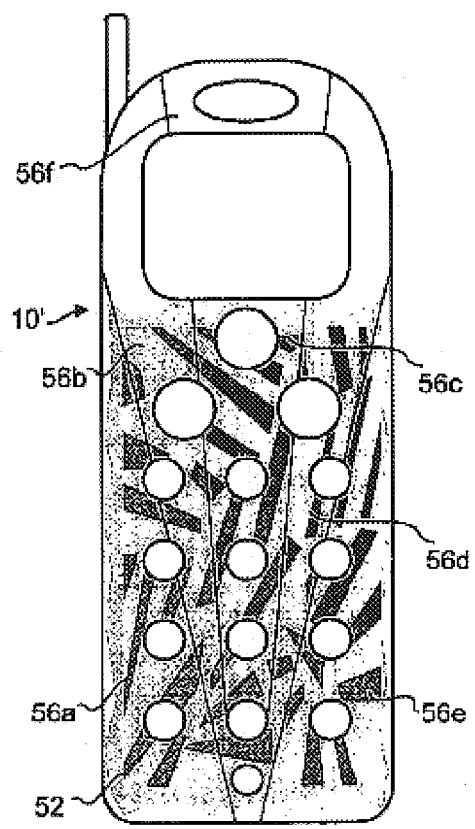
FIG. 7 is a plan view of a preferred embodiment of a decorative illuminated cover for a cellular telephone in accordance with the present invention.

In illuminated cover 10 depicted in FIG. 1, electroluminescent foil 36 is one single continuous piece. As a consequence, that cover would emit a single display of light of a single color. FIG. 7 depicts an alternative embodiment of an illuminated cover 10' in which the electroluminescent foil 36 is provided in segments 56a, 56b, 56c, 56d, 56e, and 56f. Each segment requires it own connector pin 48 or 50, and thus its own opening 40. The several segments can be provided in various colors, rather than in a single color. Likewise, the several segments can be illuminated in sequence, rather than all at the same time. Segments could be provided in appropriate shapes and colors and with appropriate lighting sequences to provide animation when energized. FIG. 7 also depicts graphic 52 which is merely illustrative of the types of graphic that might be provided between second insulating foil 38 and electroluminescent foil 36.

What is claimed is:

1. A method of making a device cover, said method comprising:

positioning a first insulating foil over a first surface of an electroluminescent foil to form a preliminary cover member;

performing the preliminary cover member into a preselected shape;

punching first holes through the preliminary cover member for passage of control keys therethrough and a second hole through the first insulating foil to expose a surface of the electroluminescent foil;

placing the preliminary cover member into a mold of the preselected shape, the mold having bosses corresponding with the first holes and to the second hole; and injecting plastic into the mold and into contact with the preliminary cover member to form the device cover, the bosses providing holes through the plastic corresponding with the first and second holes so that when the mold is opened the first holes extend through the device cover and the second hole extends to the surface of the electroluminescent foil.

2. A method as claimed in claim 1, further comprising positioning a graphic between said first insulating foil and the electroluminescent foil as part of the preliminary cover member.

3. A method as claimed in claim 2, further comprising positioning a second insulating foil beneath a second surface of the electroluminescent foil as a part of the preliminary cover member, the second insulating foil having a hole therethrough corresponding with the first hole.

4. A method as claimed in claim 3, wherein the first insulating foil is laminated onto the first surface of the electroluminescent foil, and the second insulating foil is laminated onto the second surface of the electroluminescent foil.

5. A method as claimed in claim 2, wherein the graphic is affixed on one surface of the first insulating foil before positioning of the first insulating foil over the first surface of the electroluminescent foil, and wherein the first insulating foil is positioned over the first surface of the electroluminescent foil with the graphic adjacent the electroluminescent foil.

6. A method as claimed in claim 2, wherein the graphic is printed on the first insulating foil.

7. A method as claimed in claim 2, wherein the graphic is printed on the electroluminescent foil.

8. A method as claimed in claim 1, further comprising positioning a further foil between the first insulating foil and the electroluminescent foil as part of the preliminary cover member, the further foil having a graphic on a surface thereof adjacent the first insulating foil.

9. A method as claimed in claim 1, further comprising:

allowing the plastic to cool; and removing the device cover from the mold.

* * * * *